Feb. 10, 1931.  A. W. CAPS  1,791,555
TIMING MECHANISM
Filed Dec. 28, 1927   3 Sheets-Sheet 2

INVENTOR
Arthur W. Caps
BY
his ATTORNEYS

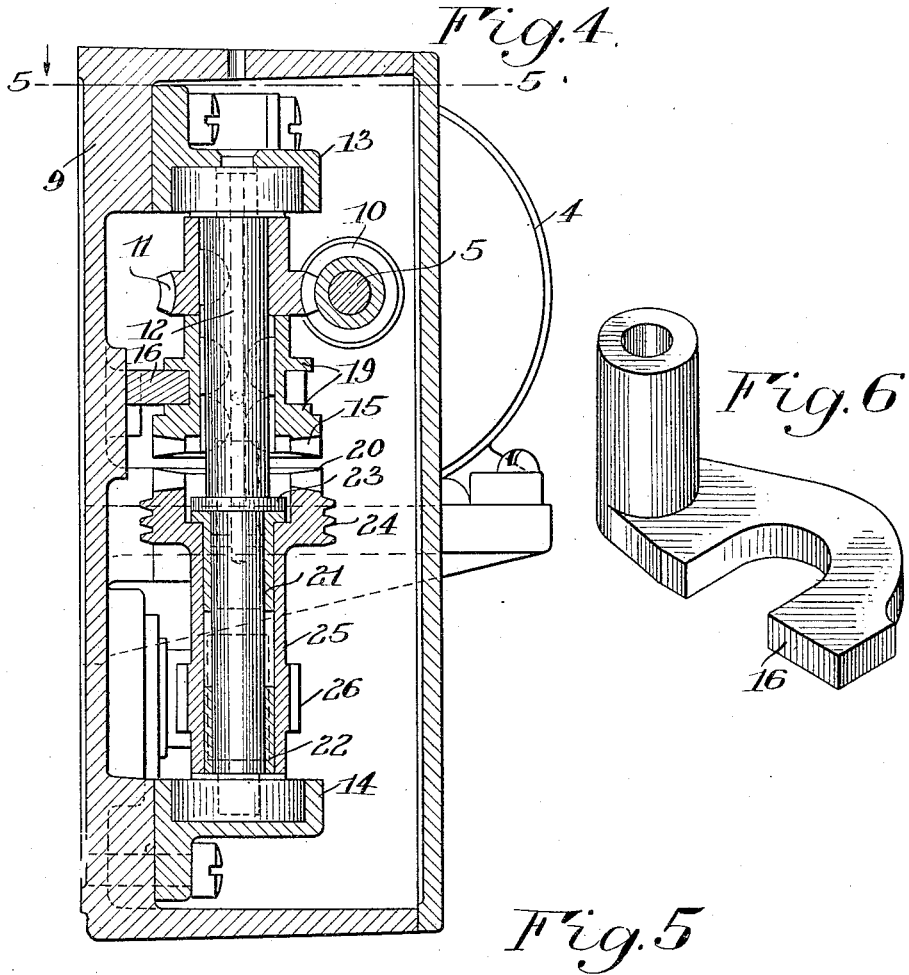

Patented Feb. 10, 1931

1,791,555

UNITED STATES PATENT OFFICE

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND

TIMING MECHANISM

Application filed December 28, 1927. Serial No. 243,081.

My present invention relates to mechanism for automatically timing periodic actuations of power driven mechanisms. The embodiment shown in the accompanying drawings and which will be specifically described hereinafter, has been designed for the purpose of imparting intermittent motion to a conveyer embodying a carrier for manipulating photographic prints through the developing apparatus of a photographic copying machine of the type described in the copending application of John S. Greene, Serial No. 243,137 filed December 28, 1927. The invention has for its object to provide a simple, efficient and dependable mechanism of this character so constructed and functioning that, upon being tripped, it will impart a predetermined movement to a driven element, which driven element in the present case is, as before stated, a print conveyer.

To these and other ends the invention resides in certain improvements and combinations of parts, all as will be hereinafter more fully described, the novel features being pointed out in the claims at the end of the specification.

In the drawings:

Figure 4 is a vertical section taken on the line 4—4 of Figure 2;

Figure 5 is a horizontal section taken on the line 5—5 of Figure 4; and

Figure 6 is an enlarged perspective view of the shifting yoke for the clutch mechanism in detail.

Similar reference numerals throughout the several views indicate the same parts.

While my invention is not to be construed as so limited in its application, I have illustrated it and will describe it in connection with a photographic copying camera, wherein it is utilized to periodically drive a conveyer that carries photographic prints through the developing apparatus of such a camera.

Figure 1:
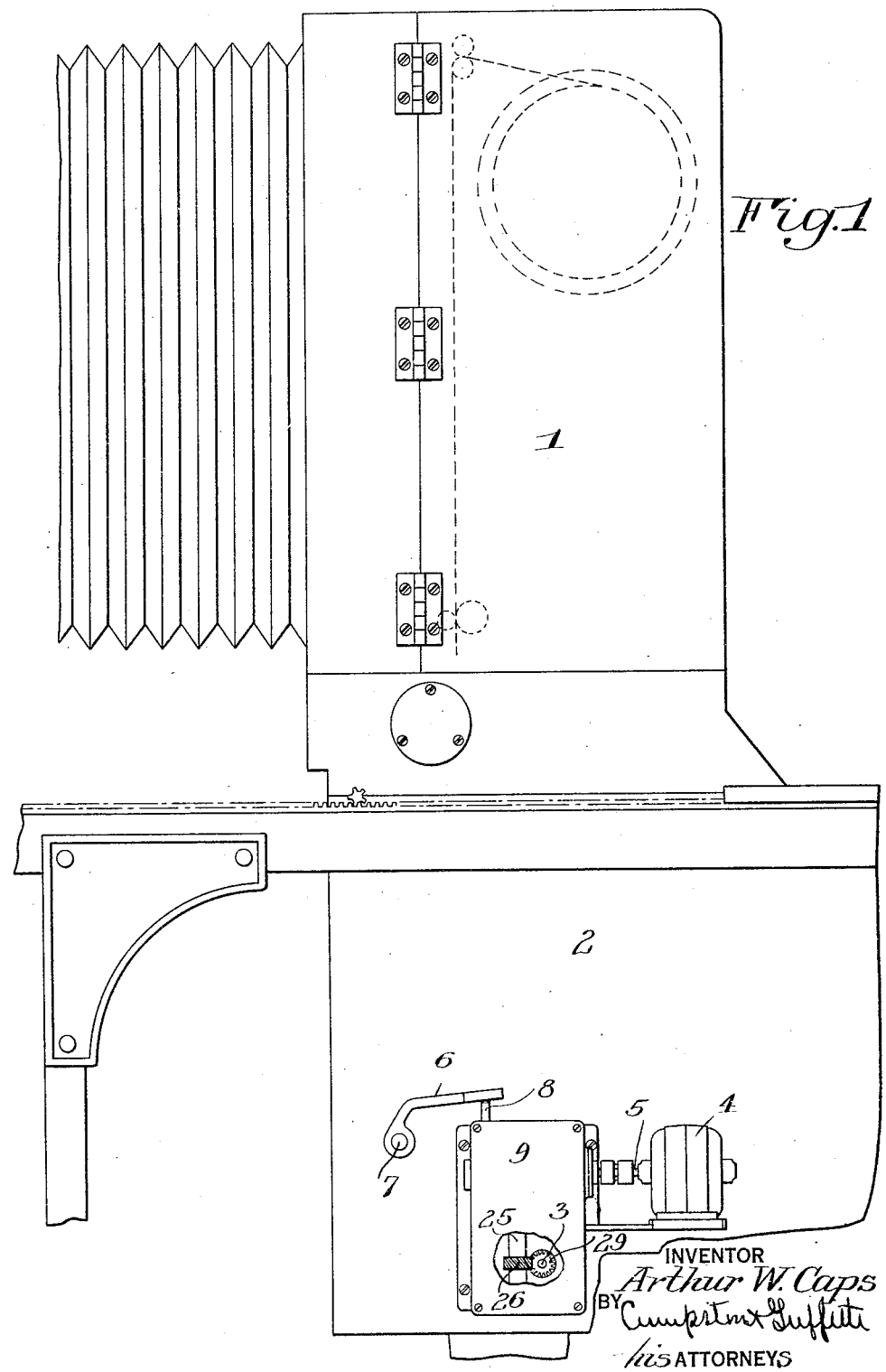
Figure 1 is a fragmentary side elevation of a photographic copying camera having attached thereto a stop mechanism constructed in accordance with, and illustrating one embodiment of, my invention.

Referring to Figure 1, 1 indicates the exposing mechanism, and 2 indicates generally the casing of the developing mechanism of such a camera. The shaft indicated at 3 I will call the driven element, it being in the present application of the invention the drive shaft for the print conveyer. A prime mover in the present shape of a motor 4 is supported on the side of the casing 2, and the problem is to convert the continuous rotation of the shaft 5 of this motor into an intermittent rotation of the driven element or shaft 3. This is accomplished through the depression of a manually operated arm 6 on a rock shaft 7. The rock shaft 6 is in contact with a plunger 8 extending into a casing 9, as does the shaft 5 of the motor 4 and in which casing the stop mechanism about to be described is housed.

Figure 2:
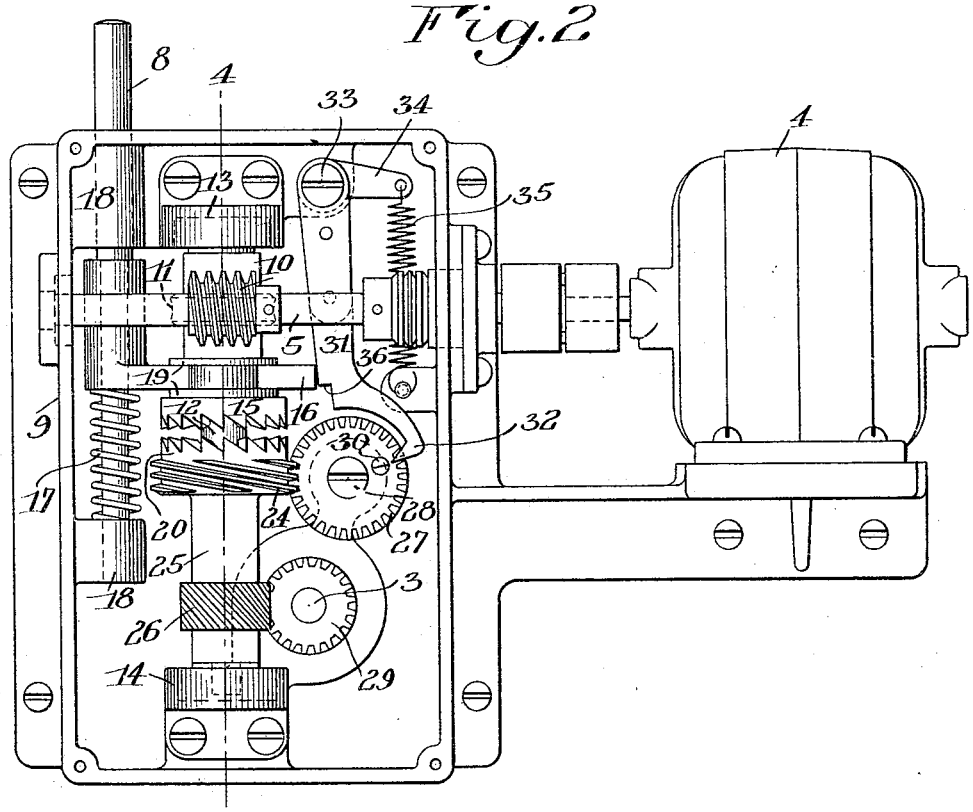
Figure 2 is an enlarged elevation of the stop mechanism and the motor by which it is driven, the cover plate of the housing of the former being removed, and the parts being in their normal or disconnected positions.

Referring more particularly to Figs. 2 and 4, the said motor shaft 5 has fixed thereto within the housing a worm 10 which worm meshes with the worm gear 11 splined on a vertical shaft 12 suitably supported in bearings 13 and 14 in the casing or housing. Below the worm gear 11 there is also splined on the vertical shaft 12 a clutch element 15 that slides vertically under the control of a shifting yoke or shipper 16, which is carried by and fixed to the plunger 8 before referred to. This plunger reciprocates in suitable bearing brackets 18; is normally held elevated by a spring 17 coiled about it and thrusting between its lower bearings 18 and yoke 16, and its said yoke engages in a reduced portion of the clutch element 15 between shoulders 19 thereon. It will thus be seen that with the parts so far described the shaft 12 is normally in gear with the continuously rotated motor shaft 5 and is rotated thereby.

Surrounding the shaft 12 below the clutch element 15 is a complementary clutch element 20. This clutch element, however, is free of the shaft turning on bushings 21 and 22 against a thrust collar 23. It is also in the form of a worm as indicated at 24, and has a sleeve portion 25 provided with another worm 26. The worm 24 meshes with a freely turning worm gear 27 mounted on a stud 28, while the worm 26 meshes with a worm gear 29 on the driven element 3. It will, therefore, be seen that when the plunger 8 is depressed and the clutch elements 15 and 20 are thereby brought into engagement through the medium of the yoke or shipping device 16, the motor shaft 5 will through the worm 26 drive the driven element 3 and also turn the free worm gear 27.

Figure 3:
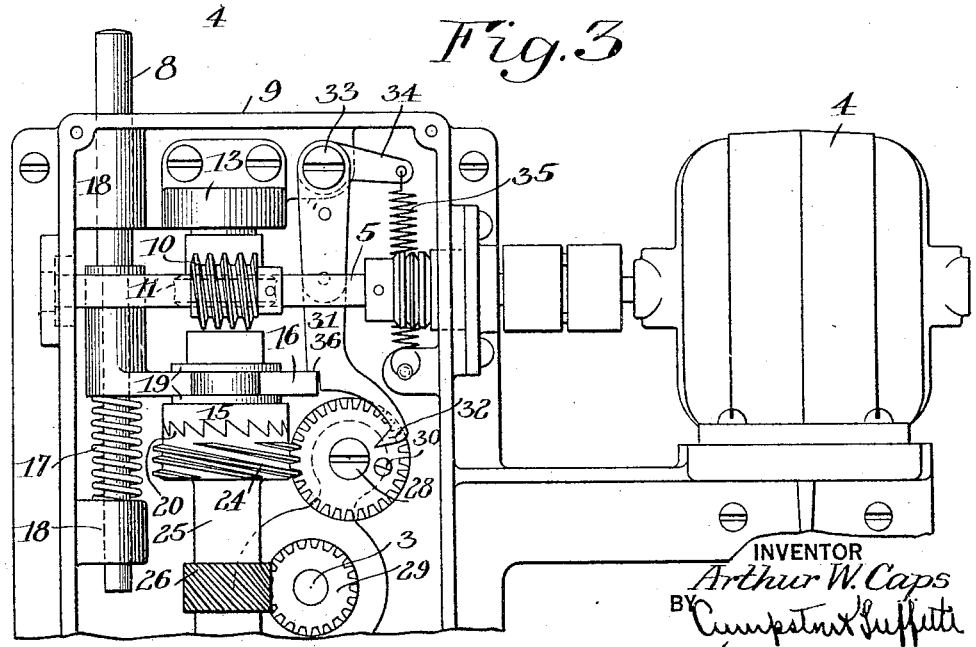
Figure 3 is a fragmentary view similar to Figure 2, but showing the driving element of the stop mechanism connected.

This worm gear 27 carries a stop pin 30, and a latch member 31 having a cam shaped engaging nose 32 is normally held, as in Figure 2 out of the path of this stop pin by engagement with the shipper yoke 16. The latch is pivoted on a stud 33 and has a bell crank arm 34 connected to a spring 35 from which it derives a tendency to move into the path of the stop pin 30. When the plunger 8 is depressed and carries the clutch elements 15 and 20 into engagement, the shipper yoke 16 locks against a shoulder 36 on the latch 31, whereby the said clutch elements are retained in engagement. In moving into this locking position under the influence of its spring 35, the latch 31 carries its nose 32 into a position in rear of but in the path of the stop pin 30 on the worm gear 27, as shown in Figure 3. Upon a complete rotation of this worm gear, however, the stop pin 30 engages the nose 32 and throws it out so that the shoulder 36 releases the shipper yoke 16 and allows it to withdraw the clutch element 15 under the influence of spring 17, thereby discontinuing the drive from worm 26 to worm gear 29 on the driven shaft 2. The gearing is such that the desired rotation of driven shaft 3 is effected upon one revolution of worm gear 27 similarly driven from the same normally free clutch element 20.

I claim as my invention:

1. In a gear drive, the combination with a drive shaft, of a driven shaft extending transversely to said drive shaft, a clutch shaft extending transversely to both said drive shaft and said driven shaft, gearing operatively connecting said drive shaft to said clutch shaft to rotate said clutch shaft from said drive shaft, a clutch element slidable longitudinally on said clutch shaft and operatively connected thereto to rotate therewith, a sleeve rotatably mounted on said clutch shaft, said sleeve having a clutch portion for cooperation with said slidable clutch element when said element is in predetermined position and also having two gear portions thereon, a gear on said driven shaft meshing with one of said gear portions so that said driven shaft is driven from said sleeve, a metering gear meshing with the other of said gear portions, and means operated by said metering gear when said metering gear reaches a predetermined position for causing said slidable clutch element to move out of engagement with said clutch portion.

2. In a gear drive, the combination with a drive shaft, of a driven shaft extending transversely to said drive shaft, a clutch shaft extending transversely to both said drive shaft and said driven shaft, gearing operatively connecting said drive shaft to said clutch shaft to rotate said clutch shaft from said drive shaft, a clutch element slidable longitudinally on said clutch shaft and operatively connected thereto to rotate therewith, an integral one-piece sleeve rotatably mounted on said clutch shaft, said sleeve having a clutch portion for cooperation with said slidable clutch element and also having two gear portions, all formed integrally on said sleeve, a gear on said driven shaft meshing with one of said gear portions so that said driven shaft is driven from said sleeve, a metering gear meshing with the other of said gear portions, and means operated by said metering gear for causing said slidable clutch element to move out of engagement with said clutch portion of said sleeve.

3. In a gear drive, the combination with a clutch shaft, a driven shaft, a clutch element slidable longitudinally on said clutch shaft, and means for driving said clutch element, of an integral one-piece sleeve rotatably mounted on said clutch shaft, said sleeve having two gear portions and a clutch portion for cooperation with said slidable clutch element, all formed integrally on said sleeve, a gear on said driven shaft meshing with one of said gear portions so that said driven shaft is driven from said sleeve, and a metering gear meshing with the other of said gear portions for controlling said slidable clutch element.

ARTHUR W. CAPS.